United States Patent
Mills et al.

[15] 3,683,151
[45] Aug. 8, 1972

[54] ELECTRICALLY HEATED BEDCOVER WITH THERMOSTATLESS OVERHEAT PROTECTION CIRCUIT AND SEPARATE COMFORT CONTROL

[72] Inventors: Edwin R. Mills, Raleigh; Ernest L. Elmore, Smithfield, both of N.C.

[73] Assignee: Fieldcrest Mills, Inc., Eden, N.C.

[22] Filed: Feb. 26, 1971

[21] Appl. No.: 119,104

[52] U.S. Cl. ............219/212, 219/501, 219/529, 219/549
[51] Int. Cl. ..............................................H05b 1/00
[58] Field of Search......219/211, 212, 527, 529, 549, 219/501; 128/379, 402; 5/343

[56] References Cited

UNITED STATES PATENTS

| | | | |
|---|---|---|---|
| 3,396,265 | 8/1968 | Jacobson | 219/212 |
| 3,356,825 | 12/1967 | Mills et al. | 219/212 |
| 3,462,585 | 8/1969 | Somers | 219/501 |
| 3,437,792 | 4/1969 | Lauck | 219/212 X |
| 3,108,175 | 10/1963 | Zartman et al. | 212/212 X |
| 3,543,005 | 11/1970 | Kelemen | 219/212 X |
| 2,959,662 | 11/1960 | Crowley et al. | 219/212 |

Primary Examiner—C. L. Albritton
Attorney—Parrott, Bell, Seltzer, Park & Gibson

[57] ABSTRACT

An electrically heated bedcover wherein the generation of heat upon flow of electrical current through an electrical heating element is controlled, in response to variations in ambient temperature affecting the comfort of a user of the bedcover, by a comfort control circuit while continuance of any unsafe localized overheat condition is prevented by an overheat protection circuit which is physically separate from the comfort control circuit. By such separation, an electrically heated bedcover having a gate controlled semiconductor switch included in a thermostatless overheat protection circuit is adapted for cooperation with a comfort control circuit which also has utility with other types of electrically heated bedcovers.

8 Claims, 4 Drawing Figures

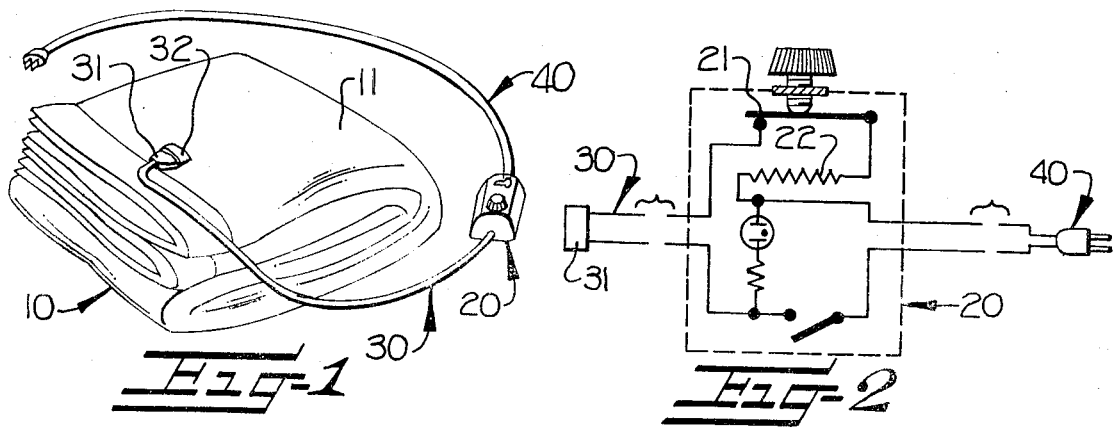
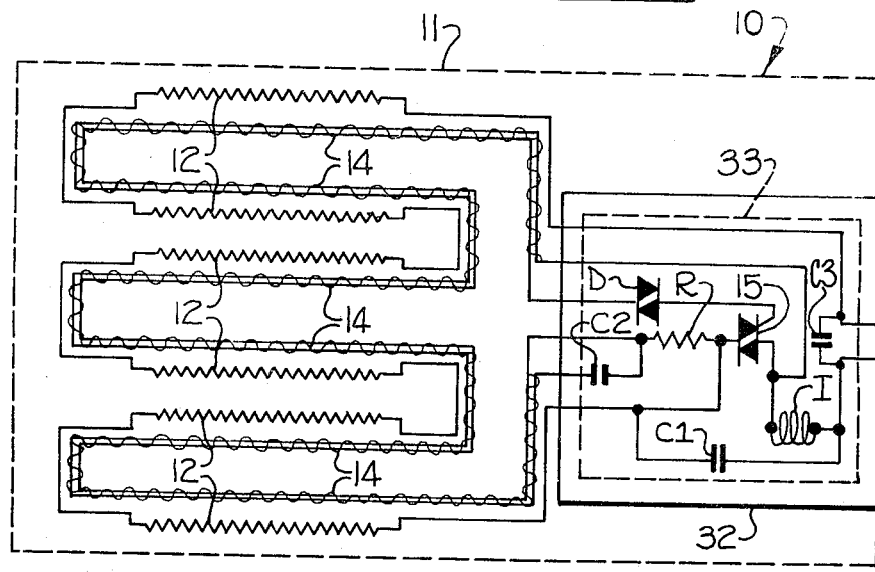
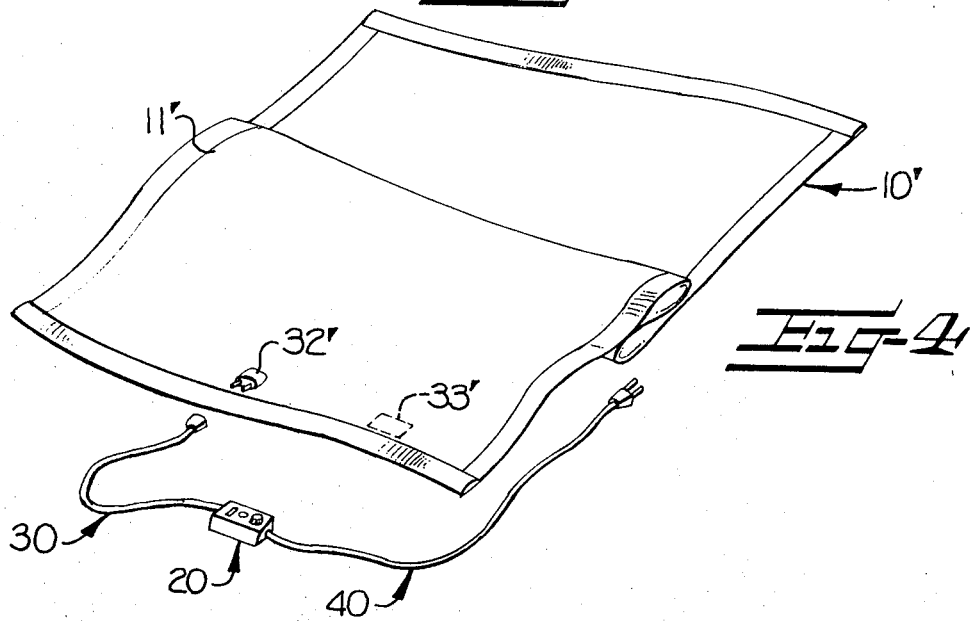

ELECTRICALLY HEATED BEDCOVER WITH THERMOSTATLESS OVERHEAT PROTECTION CIRCUIT AND SEPARATE COMFORT CONTROL

Comfort and safety of users of electrically heated bedcovers have heretofore been accommodated by using comfort control means permitting a user to warm the bedcover to varying degrees felt necessary for comfort and overheat protection means for precluding the continuance of a localized overheating condition otherwise possibly leading to injury to the user. In one conventional arrangement, overheat protection is provided by a plurality of normally closed, bimetallic thermostatic switches disposed throughout the heated area of the bedcover and electrically connected in series with an electrical resistance heating element in the bedcover. Comfort control is provided by an ambient temperature responsive control circuit including a bimetallic thermostatic switch electrically connected in series with the electrical resistance heating element, adjusted by a user and responsive to heat generated by a compensating heater. Such an arrangement for an electrically heated bedcover typically mounts the ambient temperature responsive control circuit in a housing to be positioned on a bedside table or the like, with electrical connection between the ambient temperature responsive control and the electrical resistance heating element being through an elongate cable.

Such previously used electrically heated bedcover arrangements have been widely adopted by bedcover manufacturers and, through the economies possible by mass production, have become relatively inexpensive to produce. However, such an arrangement is subject to a number of deficiencies apparent to users of such electrically heated bedcovers. In particular, the bimetallic thermostatic switches used for overheat protection are relatively bulky, and are apparent in the bedcover. The textile blanket shell or other bedcover is subject to more rapid wear at the location of a thermostat than at other locations, leading to more rapid deterioration in the appearance of the bedcover.

It has been proposed that overheat protection means in electrically heated bedcovers be constructed to avoid these deficiencies of more conventional bimetallic thermostatic switches, through use of thermostatless sensing means for detecting the occurrence of an overheat condition constructed as a pair of signal wires having a temperature sensitive material therebetween. While such electrically heated bedcovers have been successful, such arrangements are neither compatible with conventional ambient temperature responsive controllers nor as inexpensive to produce as the aforementioned conventional arrangement due to a requirement for multiple conductor cables to extend from circuitry in the bedcover to circuitry in a separate control housing.

It has now been recognized that significant economies can be realized, while taking advantage of the aesthetic and practical benefits of thermostatless overheat protection circuit means as briefly mentioned above, through the separation, in an electrically heated bedcover, of comfort control and overheat protection means. It is accordingly an object of the present invention to separate, in an electrically heated bedcover arrangement, the functions of comfort control and overheat protection, in order that the comfort control circuitry may be made operable with a variety of bedcover arrangements while a thermostatless overheat protection circuit providing aesthetic and practical benefits may be employed if desired. In accomplishing this object of the present invention, an elongate, two conductor cable means is employed for electrically connecting the comfort and overheat protection control circuitry, thereby reducing the expense incurred in manufacturing the combination in accordance with the present invention.

Some of the objects and advantages of the invention having been stated, others will appear as the description proceeds, when taken in connection with the accompanying drawings, in which FIG. 1 is a perspective view of an electrically heated bedcover in accordance with this invention;

FIG. 2 is a schematic illustration of ambient temperature responsive control circuitry used in the bedcover arrangement of FIG. 1;

FIG. 3 is a view similar to FIG. 2 illustrating overheat protection circuitry used in the bedcover arrangement of FIG. 1; and FIG. 4 is a perspective view of an alternative form of bedcover in accordance with this invention.

The electrically heated bedcover of the present invention will be described hereinafter with particular reference to the arrangement illustrated in FIGS. 1–3, with it being understood that the drawings and the following description relate to an illustrative embodiment only and are to be construed broadly, rather than being considered as limiting the present invention. An electrically heated bedcover in accordance with the present invention comprises a bedcover generally indicated at 10, a bedside comfort control housing 20, cable means 30 extending between the comfort control housing 20 and the bedcover 10, and a power cord 40 by which the electrically heated bedcover arrangement may be connected with a suitable source of alternating electrical current. Circuitry within the bedside control housing 20 and the bedcover 10, in accordance with the present invention, is described with particular reference to FIGS. 2 and 3 wherein the bedcover 10 is schematically illustrated as comprising a textile blanket shell 11, an electrical resistance heating element means 12 disposed in and extending through the blanket shell 11, sensing means generally indicated at 14 for detecting the occurrence of an overheat condition in the bedcover, and switch means 15 for responding to the occurrence of an overheat condition as disclosed more fully hereinafter. Within the housing 20 are provided comfort control means operable between conductive and non-conductive states and, in the illustrated embodiment, for varying the intervals of time during which successive complete cycles of alternating electrical current are conducted through a bimetallic thermostatic switch 21 and a compensating heater 22.

In accordance with the present invention, the cable 30 is an elongate two conductor cable extending between and electrically connecting the heating element means 12 and the circuitry within the housing 20. Preferably, for convenience in laundering and storage, the cable 30 terminates, at an end remote from the housing 20, in a first plug 31 which, together with a second plug 32 secured to the bedcover 10, comprises mating plug means for separably connecting the cable means 30 and the heating element 12. It will be noted that the illustrated embodiment is of a bedcover 10 having a single heated area rather than a dual control blanket having two heated areas separately controlled. In the latter instance (not illustrated) three or four conductor cables may be used in practicing the present invention, to provide corresponding two conductor cable means between cooperating controls and heated areas.

Where the mating plug means 31, 32 are connected, the switch means of the comfort control means is electrically connected in series with one conductor of the cable means 30 and thereby placed in series connection with the heating element 12. Thus, operation of the switch between conductive and non-conductive states varies the conduction of cycles of alternating electrical current through the heating element 12 for generating heat in the bedcover 10. The switch responds to ambient conditions by increasing the length of time for conduction through the switch as ambient temperature decreases.

The sensing means 14 and switch means 15, briefly described hereinabove, cooperate with other circuit elements now to be described to provide a thermostatless overheat protection means electrically interposed between the cable means 30 and the heating element means 12 for modulating the average power of electrical current flowing therethrough. In particular, the switch means 15, in accordance with the present invention, is a gate controlled semiconductor switch such as a thyristor capable of conducting both positive and negative half-cycles of alternating electrical current. Such a gate controlled semiconductor switch typically has first and second terminals for primary conduction of electrical current therethrough and a gate terminal to which gating signals are applied to control the portion of a cycle of alternating current conducted therethrough. By modulation of the phase relationship of gating signals applied to the gate terminal, the average power delivered through the semiconductor switch may be varied.

In the circuitry of the present invention, the semiconductor switch means 15 is located at the blanket shell 11 and is electrically connected in series with the heating element means 12. Thus, upon modulation of gating signals applied to the gate terminal of the semiconductor switch means 15, the average power of electrical current flowing through the heating element 12 is modulated.

In accordance with the present invention, sensing means 14 comprises a pair of signal wires having a temperature sensitive electrically conductive material disposed therebetween for varying conductance between the signal wires in accordance with the temperature of the sensing means 14. The sensing means 14 is disposed in the blanket shell 11 in heat exchange relation with the heating element means 12, so as to be responsive to the occurrence of a potentially unsafe localized overheating condition. Such conditions may occur, as is known, in the event that the bedcover 10 becomes wadded or covered over with a heavy bedspread or the like.

It is to be noted that a triggering capacitor C2, a resistor R and a breakdown triggering device D are electrically connected with the gate terminal of the semiconductor switch means 15. During normal operation of the circuitry of the present invention, gating signals pass through the sensing means 14 and a triggering device D in phase relation with cycles of alternating electrical current conducted through the comfort control means trigger the semiconductor switch means 15 into conduction such that substantially full cycles of alternating electrical current are normally conducted therethrough. In response to the occurrence of an overheat condition, the effective values of the triggering circuit are changed by a change in the dielectric characteristic between the signal wires of the sensing means 14, changing the phase relationship of gating signals applied to the semiconductor switch means 15 in such a way that significantly less than full cycles of alternating electrical current are conducted therethrough. The average power delivered through the heating element 12 is thus reduced, and continuance of the undesirable overheating condition is avoided.

While the combination of a breakdown triggering device D and gate controlled semiconductor switch 15 is herein disclosed as a preferred arrangement, there are presently available commercial devices which combine these functions. One such device is the Quadrac, a brand offered by ECC Corp., which combines the functions of triggering device and switch in a single unit. In one operating embodiment of this invention, the component used is an ECC Q82 Quadrac.

In order to suppress radiation of radio frequency energy, the circuitry includes a choke I and filter capacitors C1 and C3.

It is to be noted that, in the embodiment of FIGS. 2 and 3, the semiconductor switch means 15 is mounted on a circuit board 33 within the second plug 32. An alternative embodiment, illustrated in FIG. 4, differs from the embodiment of FIG. 3 in that the semiconductor switch means 15' is mounted on a circuit board 33' within the blanket shell 11', but spaced from the second plug 32'. In FIG. 4, elements which have been modified from those heretofore identified in FIGS. 1–3, but having functions similar to those elements previously identified, are identified by primed reference characters. Elements which are identical in the embodiments of FIGS. 1–3 and FIG. 4 are identified by common reference characters. The semiconductor switch means 15' of the alternative embodiment is mounted on a circuit board 33 located as indicated by the phantom line block, spaced from the second plug 32' and located near a hem of the blanket shell 11'.

As will be understood from the discussion hereinabove, the bedcover 10 in accordance with the present invention is not subject to the deficiencies heretofore noted in circumstances where overheat protection is accomplished by bimetallic thermostatic switches electrically connected in series with the heating element disposed in a textile blanket shell. Instead, a distributed sensing means 14 is employed, to permit the textile blanket shell 11 to more closely approximate the appearance of a conventional unheated bedcover and to reduce the likelihood of accelerated wear for the bedcover 10. Further, this desirable arrangement is accomplished without introducing multiconductor cable as the cable means 30 to extend between the housing 20 and bedcover 10, and without excessively complicating the comfort circuitry contained within the housing 20. Instead, the housing 20 and cable means 30 are constructed in a form which is widely applicable in connection with other, more conventional, bedcovers.

In the drawings and specification, there have been set forth preferred embodiments of the invention, and although specific terms are employed, they are used in a generic and descriptive sense only and not purposes of limitation.

That which is claimed is:

1. An electrically heated bedcover comprising:
   a bedcover,
   electrical heating means in said bedcover for generating heat upon flow of electrical current therethrough,
   comfort control means separate from said bedcover and operable between electrically conductive and non-conductive states for controlling conduction of alternating electrical current therethrough, said comfort control means including compensating means responsive to ambient temperature conditions for increasing conduction of alternating electrical current as ambient temperature decreases,
   elongate two conductor cable means extending between and electrically connecting said heating means and said comfort control means for directing electrical current conducted through said comfort control means to flow through said heating means, said cable means having a terminal end remote from said comfort control means which is adapted for connection with said heating means, and
   overheat protection means electrically connected between said remote end of said cable means and said heating means for modulating the average power of electrical current flowing therethrough, said overheat protection means including sensing means in said bedcover for detecting the occurrence of an overheat condition and switch means located at said bedcover for normally conducting substantially full cycles of alternating electrical current and for responding to the occurrence of an overheat condition by conducting significantly less than full cycles of alternating electrical current.

2. An electrically heated bedcover according to claim 1 further comprising mating plug means for separably connecting said cable means and said heating means said plug means including a first plug at a terminal end of said cable means and a second plug secured to said bedcover, and further wherein said switch means of said overheat protection means is disposed at said plug means.

3. An electrically heated bedcover according to claim 2 wherein said switch means is mounted within said second plug.

4. An electrically heated bedcover according to claim 1 wherein said switch means of said overheat protection means is mounted within said bedcover.

5. An electrically heated bedcover according to claim 1 wherein said compensating means comprises a bimetallic thermostatic switch electrically connected in series with one conductor of said cable means and compensating heater means thermally couples to said thermostatic switch for thermally biasing the same.

6. An electrically heated bedcover according to claim 1 wherein said switch means of said overheat protection means is a gate controlled semiconductor switch and said sensing means comprises temperature sensitive electrically conductive means disposed in said bedcover in heat exchange relation with said heating means and electrically connected with said semiconductor switch for controlling the portion of a cycle of alternating electrical current conducted therethrough.

7. An electrically heated bedcover comprising:
   a blanket,
   electrical heating means in said blanket for generating heat upon flow of electrical current therethrough,
   a control housing separate form said blanket,
   ambient temperature responsive control means in said housing for responding to variations in room temperature affecting the comfort of a user of the bedcover, said control means including switch means operable between electrically conductive and non-conductive states for controlling conduction of electrical current through said control means,
   cable means extending between said housing and said blanket and electrically connecting said heating means in series with said switch means, said cable means having a terminal end remote from said housing which is adapted for connection with said heating means, and
   overheat protection means for reducing the average power delivered by electrical current flowing through said heating means, said overheat protection means including gate controlled semiconductor switch means located at said blanket and electrically connected between said remote end of said cable means and said heating means and sensing means in said blanket and operatively connected to said semiconductor switch means for detecting the occurrence of an overheat condition and for modulating conductance of current through said semiconductor switch means in the event an overheat condition occurs.

8. An electrically heated bedcover comprising:
   a textile blanket shell,
   electrical heating means in said blanket shell for generating heat upon flow of electrical current therethrough,
   ambient temperature responsive control means spaced from said blanket shell for responding to variations in room temperature affecting the comfort of a user of the bedcover, said control means including switch means operable between electrically conductive and non-conductive states for controlling conduction of electrical current through aid control means,
   cable means extending between said control means and said blanket shell and electrically connecting said heating means in series with said switch means, said cable means having a terminal end remote from said control means which is adapted for connection with said heating means, and
   overheat protection means for reducing the average power delivered by electrical current flowing through said heating means, said overheat protection means including gate controlled semiconductor switch means located intermediate said blanket shell and said remote end of said cable means and electrically connected in series with said heating means and further including sensing means in said blanket shell and operatively connected to said semiconductor switch means for detecting the occurrence of an overheat condition and for modulating conductance of current through said semiconductor switch means in the event an overheat condition occurs.

* * * * *